United States Patent
Kalya et al.

(10) Patent No.: US 10,704,427 B2
(45) Date of Patent: Jul. 7, 2020

(54) METHOD TO DIAGNOSE POWER PLANT DEGRADATION USING EFFICIENCY MODELS

(71) Applicant: General Electric Company, Schenectady, NY (US)

(72) Inventors: Prabhanjana Kalya, Hyderabad (IN); Pramod Kumar Yadav, Hyderabad (IN); Sidharth Abrol, Bangalore (IN); Giriprasad Chebiyyam, Hyderabad (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 591 days.

(21) Appl. No.: 15/450,899

(22) Filed: Mar. 6, 2017

(65) Prior Publication Data

US 2018/0187574 A1    Jul. 5, 2018

(51) Int. Cl.
*F01K 23/10* (2006.01)
*H02K 7/18* (2006.01)
(Continued)

(52) U.S. Cl.
CPC ............ *F01K 23/101* (2013.01); *F01K 13/02* (2013.01); *F02C 7/00* (2013.01); *H02K 7/1823* (2013.01); *F05D 2260/80* (2013.01); *Y02E 20/16* (2013.01)

(58) Field of Classification Search
None
See application file for complete search history.

(56) References Cited

U.S. PATENT DOCUMENTS

| 4,270,503 A | 6/1981 | Pomerantz |
| 6,370,935 B1 | 4/2002 | He et al. |

(Continued)

FOREIGN PATENT DOCUMENTS

| EP | 1122625 A1 | 8/2001 |
| EP | 1457846 A2 | 9/2004 |

(Continued)

OTHER PUBLICATIONS

Savran, A., and Kahraman, G., "A fuzzy model based adaptive PID controller design for nonlinear and uncertain processes," ISA Transactions, vol. 53, Issue 2, pp. 280-288 (Mar. 1, 2014).

*Primary Examiner* — Tung S Lau
(74) *Attorney, Agent, or Firm* — Fletcher Yoder PC (57) ABSTRACT

A monitoring system of a combined cycle power plant having a topping cycle performed by a gas turbine and a bottoming cycle performed by a steam turbine, the monitoring system. The monitoring system includes a processor that receives a first set of data indicating a first measurement value of an operating parameter of the combined cycle power plant. The processor determines a baseline efficiency of the process based on the first measurement value using a bottoming cycle performance (BCP) model. The processor determines a threshold based on the baseline efficiency. The processor receives a second set of data indicating a second measurement value of the operating parameter. The processor compare the threshold to an operational efficiency based on the second measurement value using the BCP model, and provides an indication of a decrease in efficiency of the process if the operational efficiency is below the threshold.

20 Claims, 3 Drawing Sheets

(51) Int. Cl.
*F02C 7/00* (2006.01)
*F01K 13/02* (2006.01)

(56) References Cited

U.S. PATENT DOCUMENTS

| | | | |
|---|---|---|---|
| 6,823,675 | B2 | 11/2004 | Brunell et al. |
| 7,139,687 | B2 | 11/2006 | Eryilmaz et al. |
| 7,742,904 | B2 | 6/2010 | Healy et al. |
| 7,801,711 | B2 | 9/2010 | Hayashi |
| 7,930,153 | B2 | 4/2011 | Eryilmaz et al. |
| 8,024,164 | B1 | 9/2011 | Eryilmaz et al. |
| 8,566,375 | B1 | 10/2013 | Kerr-Delworth et al. |
| 2001/0023576 | A1* | 9/2001 | Rollins ............... F01K 23/105 60/772 |
| 2004/0123600 | A1 | 7/2004 | Brunell et al. |
| 2005/0162174 | A1 | 7/2005 | Huang |
| 2011/0071812 | A1 | 3/2011 | Fang |
| 2011/0224959 | A1 | 9/2011 | Zhang et al. |
| 2012/0070266 | A1 | 3/2012 | Schaberg et al. |
| 2013/0327053 | A1 | 12/2013 | Mitchell et al. |
| 2014/0020400 | A1 | 1/2014 | Ceccherini et al. |
| 2014/0067360 | A1 | 3/2014 | Bhamidipaty et al. |
| 2014/0297053 | A1 | 10/2014 | Morgan et al. |
| 2015/0185716 | A1* | 7/2015 | Wichmann ........... F01K 23/101 700/287 |
| 2017/0068886 | A1 | 3/2017 | Cheng |
| 2017/0262572 | A1 | 9/2017 | Mori et al. |
| 2017/0364043 | A1* | 12/2017 | Ganti ................. G05B 13/048 |
| 2018/0073817 | A1* | 3/2018 | Sikora ................. F28D 20/02 |

FOREIGN PATENT DOCUMENTS

| | | |
|---|---|---|
| EP | 1712767 B1 | 1/2008 |
| EP | 2506095 A2 | 10/2012 |
| EP | 3263985 A1 | 1/2018 |

\* cited by examiner

METHOD TO DIAGNOSE POWER PLANT DEGRADATION USING EFFICIENCY MODELS

CROSS REFERENCE TO RELATED APPLICATIONS

This application claims priority to Indian Patent Application No. 201741000432 entitled "A Method to Diagnose Power Plant Degradation Using Efficiency Models", filed Jan. 4, 2017, which is herein incorporated by reference.

BACKGROUND

The subject matter disclosed herein relates to power generation, and more particularly, to monitoring systems for a bottoming cycle of a combined cycle power plant.

In power generation systems, thermodynamic cycles may refer to processes that use heat or other forms of energy to generate power. For example, combined cycle power plants may include a topping power plant cycle performed by a gas turbine and a bottoming power plant cycle performed by a steam turbine. The cycles may operate in conjunction with each other to produce power at a higher overall efficiency than systems that do not include combined cycle power. For instance, in some power generation systems, power from the steam turbine and the gas turbine may be used to rotate a shaft. The steam turbine and/or the gas turbine may degrade over time. However, because power generation of the steam turbine and the gas turbine is combined to generate power, it may be difficult to diagnose which part of the combined cycle power plant decreases in performance of the power generation system.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

In a first embodiment, a monitoring system of a combined cycle power plant having a topping cycle performed by a gas turbine and a bottoming cycle performed by a steam turbine, the monitoring system includes a processor operatively coupled to a memory, wherein the processor is configured to receive a first set of data indicating a first measurement value of an operating parameter of the combined cycle power plant, wherein the operating parameter is associated with a process performed by the bottoming cycle of the combined cycle power plant, determine a baseline efficiency of the process based on the first measurement value using a bottoming cycle performance (BCP) model, wherein the baseline efficiency is associated with nominal operation of the combined cycle power plant, determine a threshold based on the baseline efficiency, receive a second set of data indicating a second measurement value of the operating parameter, compare the threshold to an operational efficiency, wherein the operational efficiency is determined based on the second measurement value using the BCP model, and provide an indication of a decrease in efficiency of the process if the operational efficiency is below the threshold.

In a second embodiment, a non-transitory computer readable medium includes instructions configured to be executed by a processor of a monitoring system of a combined cycle power plant having a topping cycle performed by a gas turbine and a bottoming cycle performed by a steam turbine, wherein the instructions include instructions configured to cause the processor to receive a first set of data indicating a first measurement value of an operating parameter of the combined cycle power plant, wherein the operating parameter is associated with a process performed by the bottoming cycle of the combined cycle power plant, determine a baseline efficiency of the process based on the first measurement value using a bottoming cycle performance (BCP) model, wherein the baseline efficiency is associated with nominal operation of the combined cycle power plant, determine a threshold based on the baseline efficiency, receive a second set of data indicating a second measurement value of the operating parameter, compare the threshold to an operational efficiency, wherein the operational efficiency is determined based on the second measurement value using the BCP model, and provide an indication of a decrease in efficiency of the process if the operational efficiency is below the threshold.

In a third embodiment, a method includes receiving a first set of data indicating a first measurement value of an operating parameter of a combined cycle power plant, wherein the operating parameter is associated with a process performed by a bottoming cycle of a combined cycle power plant, determining a baseline efficiency of the process based on the first measurement value using a bottoming cycle performance (BCP) model, wherein the baseline efficiency is associated with nominal operation of the combined cycle power plant, determining a threshold based on the baseline efficiency, receiving a second set of data indicating a second measurement value of the operating parameter, comparing the threshold to an operational efficiency, wherein the operational efficiency is determined based on the second measurement value using the BCP model, and providing an indication of a decrease in efficiency of the process if the operational efficiency is below the threshold.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are related to a monitoring system that monitors decreases in efficiency of combined cycle power plants. Combined cycle power plants may include a gas turbine and a steam turbine that operate in conjunction with each other to produce mechanical and electrical energy that powers one or more loads. For example, the gas turbine may receive a fuel and an oxidant, such as air, and combust the fuel and the oxidant to generate mechanical energy to rotate a shaft of a generator that is used to provide power one or more loads. Further, the steam turbine may receive steam from exhaust of the gas turbine to rotate one or more turbine blades to generate mechanical energy to again rotate a shaft of a generator and provide power the one or more loads. In some embodiments, the gas turbine and the steam turbine may be coupled to a single shaft to provide the mechanical energy to one generator, which outputs electrical energy to the one or more loads.

Due to the combined nature of the gas turbine and steam turbine (e.g., having a single shaft), it may be difficult to determine contributions of the steam turbine and/or the gas turbine to the total power output of the combined cycle power plant. Further, due to various conditions (e.g., degradation over time, ambient temperatures of the combined cycle power plant, etc.), it may be difficult to discern what parts of the combined cycle power plant are causing decreases in efficiency. It might also be difficult to discern between anomalous operation and degradation which lead reduced efficiency of the power plant.

A monitoring system is described below that monitors changes in efficiency of a combined cycle power plant to identify degradation in one or more parts of the combined cycle power plant. In an embodiment, the monitoring system may include a processor operatively coupled to a memory. The processor may receive a first set of data indicating a first measurement of an operating parameter of the combined cycle power plant. The operating parameter may include any characteristic of conditions associated with operation of the combined cycle power plant, such as temperature, pressure, flow rate, changes in temperature, pressure, or flow rate, gas compositions or concentrations, moisture levels, electrical power, torque, rotational speed, and the like. For example, the processor may receive data indicating a measurement of flow of steam entering discs of the steam turbine. The processor may determine a baseline of a process performed by the bottoming cycle, or the process performed by the steam turbine, of the combined cycle power plant. For example, the processor may determine the baseline by using a bottoming cycle performance model. From the baseline, the processor may determine a threshold level of efficiency to allow for a margin of error due to inherent measurement and modeling uncertainties. The baseline may correspond to a best available performance (e.g., nominal operation) of the combined cycle power plant. The model provides efficiencies of the combined cycle power plant based on the inputs, such as the flow of steam entering the steam turbine. The processor may receive a second set of data indicating a second measurement of the operating parameter. In some embodiments, the second set of data indicating the second measurement may refer to real time data related to the operating parameter of the combined cycle power plant. The processor may compare the threshold to an operational efficiency based on the second set of data. The processor may provide an indication of a decrease in efficiency of the process if the operational efficiency is below the threshold. Further, the processor may identify one or more parts that may cause the decrease in efficiency of the process. Indeed, in some embodiments, the processor may adjust operations of the combined cycle power plant based on the identified causes of the decreases in efficiency.

Figure 1:
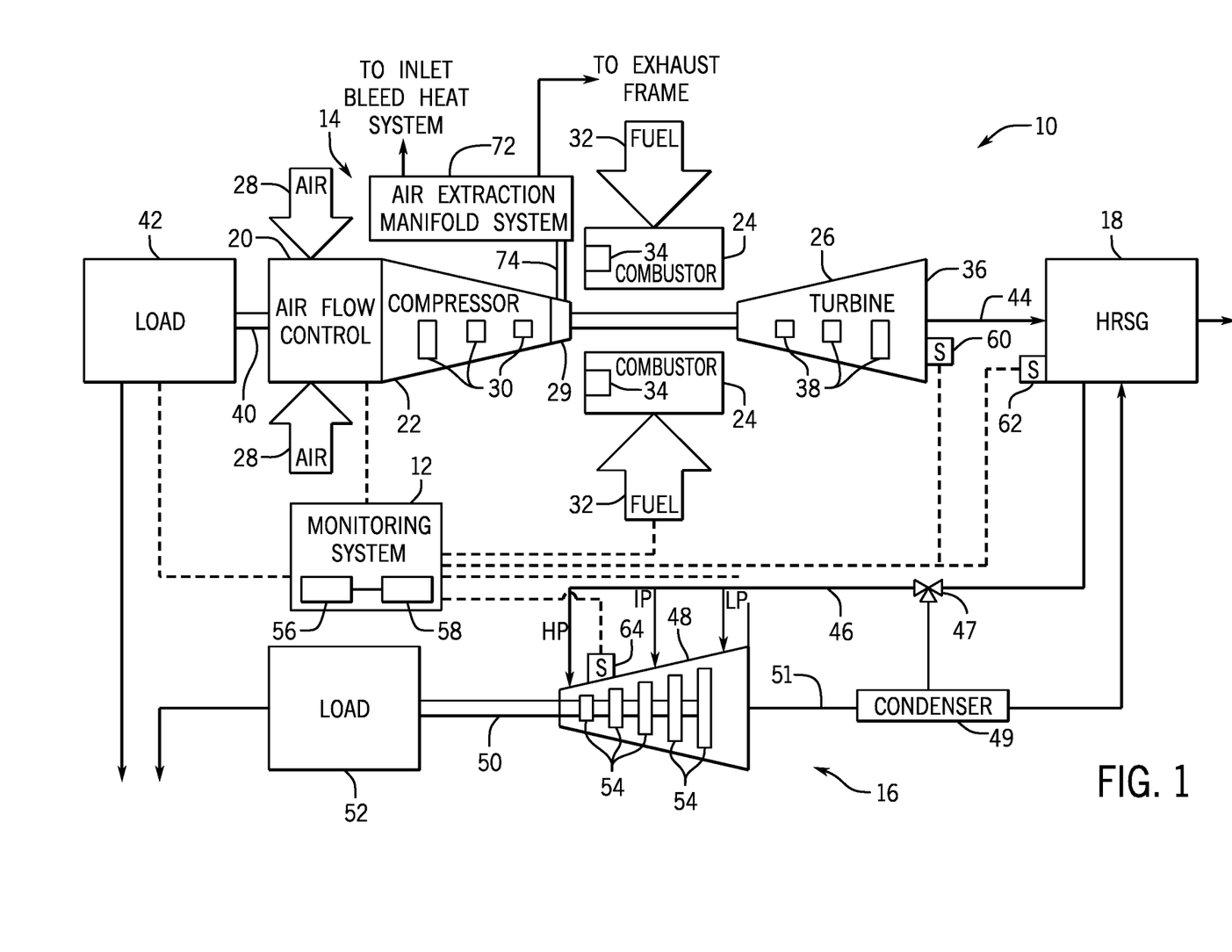
FIG. 1 is a block diagram of a combined cycle power plant (CCPP) having a monitoring system that monitors an operation performed by a bottoming cycle of the CCPP, in accordance with an embodiment.

By way of introduction, FIG. 1 is a block diagram of an embodiment of a combined cycled power plant 10 with a monitoring system 12 that may monitor operations performed by the combined cycle power plant 10. In some embodiments, the monitoring system 12 may be incorporated into a controller of the combined cycle power plant to control the operations performed by the combined cycle power plant 10, increasing power output or decreasing power output from a gas turbine system 14 and/or a steam turbine system 16.

Keeping this in mind, the combined cycle power plant (CCPP) 10 includes the monitoring system 12, the gas turbine system 14, the steam turbine system 16, and a heat recovery steam generator (HRSG) 18. In operation, the gas turbine system 14 combusts a fuel-air mixture to create torque that drives a load (e.g., an electrical generator). In order to reduce energy waste, the combined cycle power plant 10 uses the thermal energy in the exhaust gases to heat a fluid and create steam in the HRSG 18. The steam travels from the HRSG 18 through a steam turbine system 16 creating torque that drives a load (e.g., an electrical generator). Accordingly, the CCPP 10 combines the gas turbine system 14 with steam turbine system 16 to increase power production while reducing energy waste (e.g., thermal energy in the exhaust gas).

The gas turbine system 14 includes an airflow control module 20, compressor 22, combustor 24, and turbine 26. In operation, an oxidant 28 (e.g., air, oxygen, oxygen enriched air, or oxygen reduced air) enters the turbine system 14 through the airflow control module 20, which controls the amount of oxidant flow (e.g., airflow). The airflow control module 20 may control airflow by heating the oxidant flow, cooling the oxidant flow, extracting airflow from the compressor 22, using an inlet restriction, using an inlet guide vane, or a combination thereof. As the air passes through the airflow control module 20, the air enters the compressor 22. The compressor 22 pressurizes the air 28 in a series of compressor stages (e.g., rotor disks 30) with compressor blades. After the air 28 is pressurized, the pressurized air may reside in a compressor discharge chamber 29 before the compressed air exits the compressor 22.

As the compressed air exits the compressor 22, the air enters the combustor 24 and mixes with fuel 32. The turbine system 14 may use liquid or gas fuel, such as natural gas and/or a hydrogen rich synthetic gas, to run the turbine system 14. For example, the fuel nozzles 34 may inject a fuel-air mixture into the combustor 24 in a suitable ratio for optimal combustion, emissions, fuel consumption, and power output. As depicted, a plurality of fuel nozzles 34 intakes the fuel 32, mixes the fuel 32 with air, and distributes the air-fuel mixture into the combustor 24. The air-fuel mixture combusts in a combustion chamber within combustor 24, thereby creating hot pressurized exhaust gases. The combustor 24 directs the exhaust gases through a turbine 26 toward an exhaust outlet 36. As the exhaust gases pass through the turbine 26, the gases contact turbine blades attached to turbine rotor disks 38 (e.g., turbine stages). As the exhaust gases travel through the turbine 26, the exhaust gases may force turbine blades to rotate the rotor disks 38. The rotation of the rotor disks 38 induces rotation of shaft 40 and the rotor disks 32 in the compressor 26. A load 42 (e.g., electrical generator) connects to the shaft 40 and uses the rotation energy of the shaft 40 to generate electricity for use by the power grid.

As explained above, the combined cycle power plant 10 harvests energy from the hot exhaust gases exiting the gas turbine system 14 for use by the steam turbine system 16 or a boiler. Specifically, the CCPP 10 channels hot exhaust gases 44 from the turbine system 14 into the heat recovery steam generator (HRSG) 18. In the HRSG 18, the thermal energy in the combustion exhaust gases converts water into hot pressurized steam 46. The HRSG 18 releases the steam in line 46 for use in the steam turbine system 16. Further, the steam in line 46 may be provided at various locations of the steam turbine 16 depending on pressure of the steam. For example, high pressure (HP) steam may be received by the steam turbine 16 at a first location, intermediate pressure (IP) steam may be received by the steam turbine 16 at a second location, and low pressure (LP) steam may be received by the steam turbine 16 at a third location. Although three locations are illustrated in FIG. 1, any suitable number of locations may be used to feed the steam from the HRSG 18 into the steam turbine 16.

The steam turbine system 16 includes a turbine 48, shaft 50, and load 52 (e.g., electrical generator). As the hot pressurized steam in line 46 enters the steam turbine 48, the steam contacts turbine blades attached to turbine rotor disks 54 (e.g., turbine stages). As the steam passes through the turbine stages in the turbine 48, the steam induces the turbine blades to rotate the rotor disks 54. The rotation of the rotor disks 54 induces rotation of the shaft 50. As illustrated, the load 52 (e.g., electrical generator) connects to the shaft 50. Accordingly, as the shaft 50 rotates, the load 52 (e.g., electrical generator) uses the rotation energy to generate electricity for the power grid. As the pressurized steam in line 46 passes through the turbine 48, the steam loses energy (i.e., expands and cools). After exiting the steam turbine 48, the steam exhaust 51 enters a condenser 49 before being routed back to the HRSG 18, where the steam is reheated for reuse in the steam turbine system 16.

Generally, the monitoring system 12 may include a memory 56 and a processor 58. The memory 56 stores instructions and steps written in software code. The processor 58 executes the stored instructions in response to data received from the CCPP 10. More specifically, the monitoring system 12 be incorporated in a controller that controls and communicates with various components in the CCPP 10 in order to flexibly control the loading of the gas turbine system 14, and thus the loading of the steam turbine system 16. As illustrated, the controller may control the airflow control module 20, the intake of fuel 32, and valve(s) 47; and the monitoring system 12 may communicate with load 42, exhaust gas temperature sensor 60, HRSG steam temperature sensor 62, and steam turbine metal temperature sensor 64, and the like.

In operation, the controller of the CCPP 10 may control the airflow control module 20 and the consumption of fuel 32 to change the loading of the gas turbine system 14 and thereby the loading of CCPP 10 (i.e., how the CCPP 10 increases electrical power output to the grid). Specifically, the controller adjusts a mass flow rate and temperature of the exhaust gas 44, which controls how rapidly the HRSG 18 produces steam for the steam turbine system 16, and therefore, how quickly the CCPP 10 produces electrical power using loads 42 and 52. For example, when the controller increases the airflow with the airflow control module 20, it increases the amount of airflow flowing through the compressor 22, the combustor 24, and the turbine 26. The increase in airflow increases the mass flow rate of the exhaust gas, and thus increases the torque of the shaft 40. Moreover, the increase in the mass flow rate of the exhaust gas 44 increases the amount of thermal energy available for the HRSG 18 to produce steam (i.e., more exhaust gas is flowing through the HRSG 18). An increase in steam production by the HRSG 18 reduces startup time for the steam turbine system 16 and thus increases electrical output from the load 52.

Although the monitoring system 12 has been described as having the memory 56 and the processor 58, it should be noted that the monitoring system 12 may include a number of other computer system components to enable the monitoring system 12 to control the operations of the CCPP 10 and the related components. For example, the monitoring system 12 may include a communication component that enables the monitoring system 12 to communicate with other computing systems. The monitoring system 12 may also include an input/output component that enables the monitoring system 12 to interface with users via a graphical user interface or the like.

The CCPP 10 includes a combination of cycles to generate power. That is, the CCPP 10 may include a cycle of the gas turbine 14, referred to as a topping cycle, and a cycle of the steam turbine 16, referred to as a bottoming cycle. Although FIG. 1 depicts the shaft 50 of the steam turbine 16 as separate from the shaft 40 of the gas turbine 14, this is meant to be illustrative to show each of the cycles of the CCPP 10. The CCPP 10 may include a single shaft between the gas turbine 14 and the steam turbine 16. As described below, the single shaft may be referred to with reference numbers 40 and 50. To assess performance of the bottoming cycle, a bottoming cycle performance (BCP) model may be developed to determine the contribution of power from the steam turbine 16 to the CCPP 10 (e.g., rotational energy delivered to the single shaft).

As the gas turbine 14 and the steam turbine 16 share the single shaft 40 and 50, the monitoring system 12 may utilize a BCP model to determine the contribution of power from the steam turbine 16 to the CCPP 10. The BCP model may be an equation that relates the total energy losses (TEL) of energy delivered to the shaft 40 and 50 to one or more measurements of the CCPP 10. For example, values from the BCP model may summed with values from a topping cycle performance (TCP) model to determine TEL of energy delivered to the shaft 40 and 50. Further, to determine the TEL of the CCPP 10, the BCP model may determine and provide one or more efficiencies of the CCPP 10, such as an HRSG high pressure intermediate pressure (HPIP) efficiency, HRSG low pressure (LP) efficiency, steam turbine efficiency, and the like. Each of the efficiencies may be determined by inputting measurements of the CCPP 10 into the BCP model, and the efficiencies may be used to subsequently calculate the TEL. For example, the processor 58 may utilize the BCP model to estimate power output of the steam turbine 16 based on exhaust measurements coming from the gas turbine 14. Further, the BCP model may estimate efficiency of various aspects of the steam turbine 16 and HRSG 18. For instance, the BCP model may estimate the HRSG HPIP efficiency of power generated from the steam 46 entering at the HP and the IP locations of the steam turbine 16, HRSG LP efficiency of power generated from the steam 46 entering at the LP location of the steam turbine 16, and the like, using measurements of one or more operating parameters of the steam turbine 16. That is, the processor 58 may input measurements of flows, pressures, and temperatures of steam 46 entering the steam turbine 16, physical characteristics of the steam turbine 16 these inputs are then used to estimate the efficiency of the sub-component of the CCPP (e.g., HRSG HPIP section). A combination of thermodynamic relationship and data driven models can be used to realize the efficiency models as a function of measured parameters like flows, temperatures and pressure.

The monitoring system 12 may be located proximate to the CCPP 10 or may be a cloud based service. Further, the monitoring system 12 may include models that estimate efficiencies, such as HRSG HPIP efficiency, based on measurements, such as HP flow. The monitoring system 12 may then identify the one or more parts that have degraded compared to prior efficiencies determined at earlier times. For example, the monitoring system 12 may provide an estimate of the HPIP efficiency by inputting measurements of flows, pressures, and/or temperatures of steam 46 entering the HP and IP parts of the steam turbine 48 and measurements of flows, pressures, and/or temperatures of steam exiting the HP and IP parts and entering the LP part of the turbine 48. In this example, if the flows, pressures, and/or temperatures of the steam entering the LP part of the turbine 48 decreases while the flows, pressures, and/or temperatures entering the HP and IP parts of the turbine 48 are maintained, then the monitoring system 12 may determine, using the model, that HRSG HPIP efficiency has decreased, thereby indicating that the HP and IP parts of the steam turbine 48 have degraded. As such, the monitoring system may send a signal to an electronic device of an operator to communicate to the operator that the HP and IP parts of the turbine 48 may be replaced to improve efficiency of the steam turbine 16.

Figure 2:
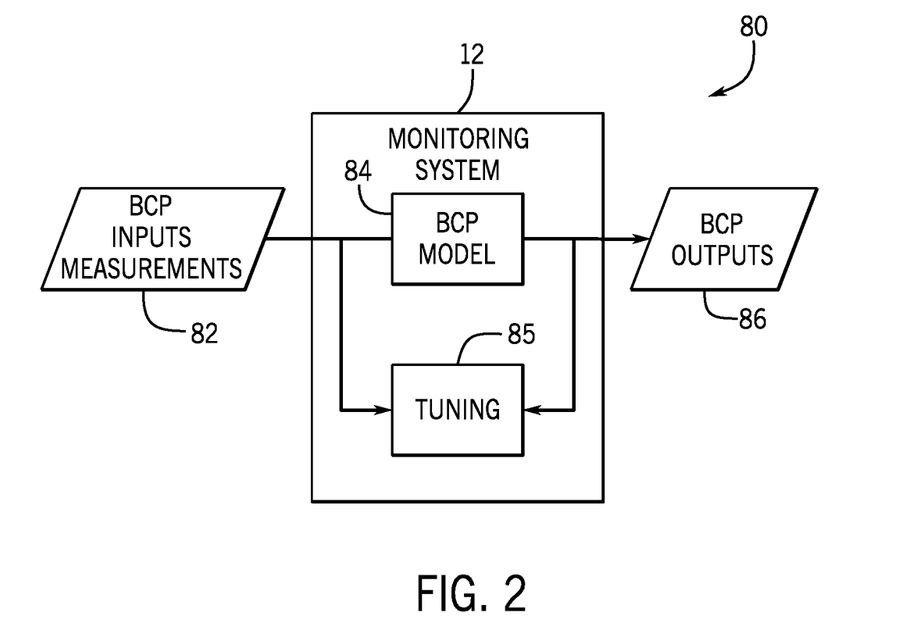
FIG. 2 is a flow diagram of a process performed by the monitoring system of FIG. 1, in accordance with an embodiment.

FIG. 2 is a data flow diagram 80 of data received and output by the monitoring system 12. The processor 58 may receive data from the sensors 60, 62, and 64, such as measured flows, pressures, temperatures, and the like, from the HRSG 18, steam turbine 16, gas turbine 14, and the like, as provided via data block 82. For example, the processor 58 may receive measured flows of steam 46 entering the turbine 48 of the steam turbine 16 system.

The processor 58 may then execute instructions stored in the memory 56 to estimate output power from the gas turbine and/or the steam turbine 16 using a BCP model 84. Further, the processor 58 may utilize the BCP model 84 to estimate total energy losses (TEL) of energy delivered to the single shaft 40 and 50 from the steam turbine 16 component of the CCPP 10. To estimate the TEL of the steam turbine 16, the processor 58 may calculate various efficiencies based on the measured flows, pressures, temperatures, and the like. For example, the processor 58 may calculate HRSG HPIP efficiency, HRSG LP efficiency, steam turbine efficiency, and the like, based on the measured operating parameters of the CCPP 10. For instance, efficiency can be calculated as a combination of heat transfer equations and empirical understanding. In some embodiments, the processor may estimate losses of each of the efficiencies and subtract the losses from an available gas turbine exhaust energy to estimate the TEL. In some embodiments, the processor 58 may provide the input measurements to a tuning block 85 of the monitoring system 12 to tune the BCP model 84 based on the data.

The processor 58 may then output data block 86, which include estimates of efficiency of one or more parts or components of the bottoming cycle from the BCP model. Further, as explained below, the processor 58 may utilize the estimates of efficiency of the one or more parts or components of the steam turbine 16 to determine if the one or more parts of the CCPP 10 are degrading or failing. That is, the processor 58 may determine if the efficiency of the one or more parts or components decreases (e.g., degrades) over time.

Figure 3:
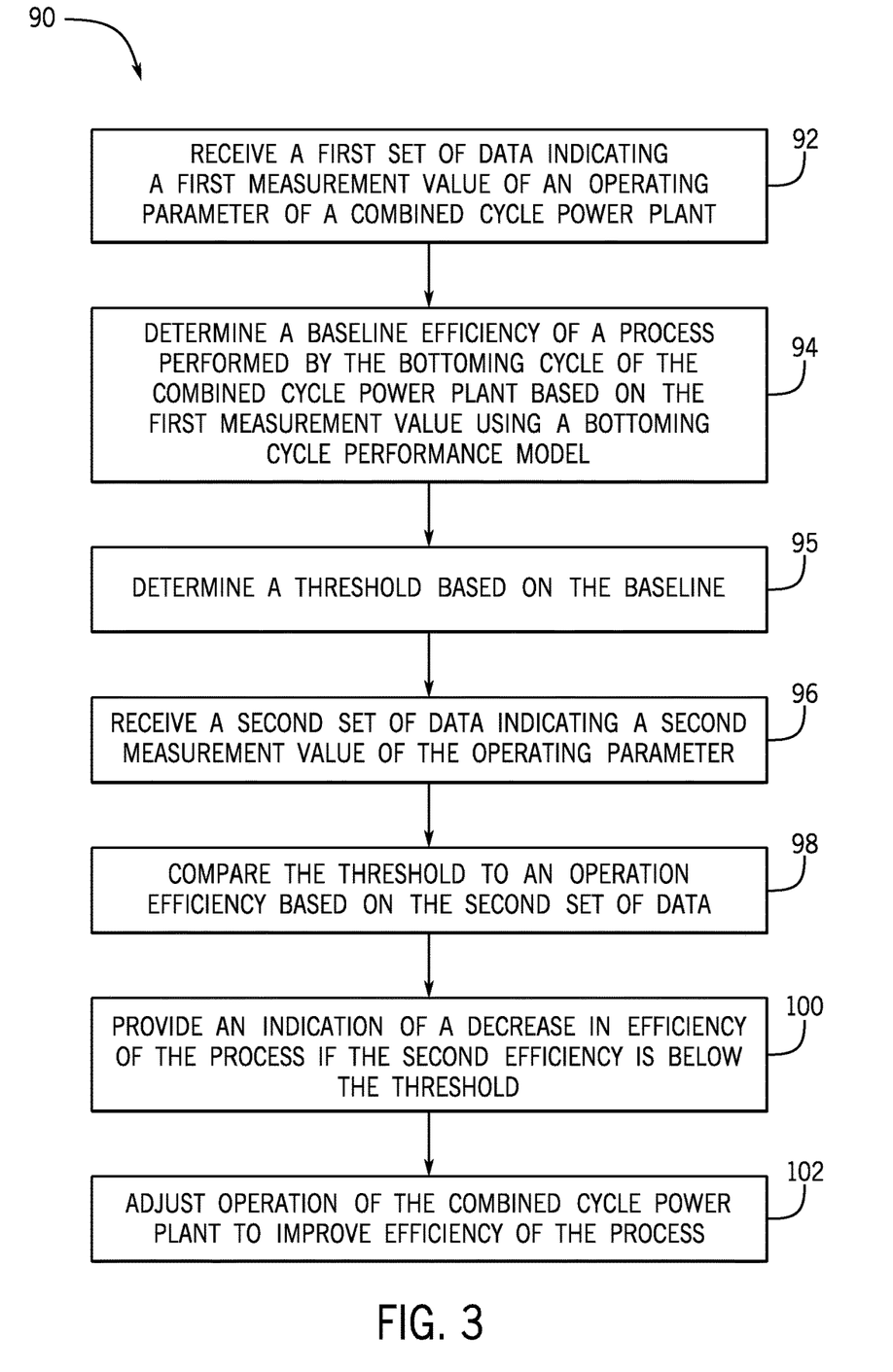
FIG. 3 is a flow diagram of a process performed by the monitoring system of FIG. 1 to monitor decreases in efficiency of the operation, in accordance with an embodiment.

FIG. 3 is a flow diagram of a process 90 of instructions to be executed by the processor 58 of the monitoring system to detect decreases in efficiency of the bottoming cycle of the CCPP 10. At block 92, the processor 58 may receive a first set of data indicating a first measurement value of an operating parameter of the CCPP 10. As mentioned above, the measurement value may include a flow value, pressure value, temperature value, or any other suitable measurement value of an operating parameter of the CCPP 10. For example, the operating parameter may include flow of steam 46 entering the turbine 48.

At block 94, the processor 58 may determine a baseline map based on an efficiency of a process performed by the bottoming cycle. As described above, the baseline may be determined based on the first measurement value using efficiencies determined by the bottoming cycle performance (BCP) model it is assumed that the baseline corresponds to the nominal operation of the plant and forms a basis for comparison with anomalous or degraded operation. That is, the baseline may be associated with nominal operation (e.g., the expected operation) of the CCPP in which the CCP operates without anomalies or degradation. For example, the baseline may be output of a function determined empirically. The output of the function may be based on the efficiency of the LP section of the HRSG, obtained as an output of the BCP model and include independent parameters that affect the LP HRSG section. Further, the processor 58 may continue to acquire additional data prior to establishing the baseline to ensure that the baseline accounts for ambient conditions or other causes of variation in the process. In some embodiments, upon acquiring adequate additional data that satisfies a minimum level of confidence, the processor 58 may maintain the baseline at a set value during the following steps.

At block 95, the processor 58 may determine a threshold as well which signifies that range within which the measured efficiency can deviate from the baseline efficiency. The threshold may be established by having a preset tolerance (e.g., a 10% margin of error) from the determined baseline map. Values below the threshold may be associated with a decrease in efficiency of one or more parts of the combined cycle power plant as compared to the baseline map while accounting for variations.

At block 96, the processor 58 may receive a second set of data indicating a second measurement of the operating parameter or another operating parameter. The processor 58 may receive the second set of data in real time. Further, in some embodiments, the data may be communicated to a cloud based environment, located remotely from the CCPP 10, where the data is processed.

At block 98, the processor 58 may compare the threshold to an operational efficiency based on the measurement. That is, the processor may compare the baseline that is established from prior data of the combined cycle power plant with the real-time data to determine if the process has decreased in efficiency (e.g., due to degradation). For example, the processor 58 may determine the operational efficiency (e.g., HRSG HPIP efficiency) by inputting the second measurement into the BCP model to estimate the operational efficiency. The second measurement may include a flow measurement, a temperature measurement, or a pressure measurement, and the like.

At block 100, the processor 58 may provide an indication of a decrease in efficiency of the process if the operational efficiency is below the threshold. That is, the processor 58 may provide a flag on a display of the monitoring system 12 to indicate the decrease in efficiency to the customer. Further, the processor 58 may identify one or more parts of the steam turbine 16 that have degraded.

At block 102, the processor 58 may adjust operation of the combined cycle power plant to improve efficiency of the process. For example, the processor 58 may control the fuel-air ratio entering the gas turbine to increase the flow of steam 46 entering the steam turbine 16 to improve the efficiency of the process. Alternatively and/or additionally, the processor 58 may send a signal to an electronic device of an operator to provide the indication of the decrease in efficiency, thereby enabling the operator to replace one or more parts of the combined cycle power plant. The indication may be associated with anomalies or degradation of the combined cycle power plant.

Technical effects of the present disclosure include systems and methods that monitor efficiencies of combined cycle power plants. The monitoring system may receive measurements of the combined cycle power plant and use a model to estimate an efficiency of the combined cycle power plants. The monitoring system may compare the efficiency with prior efficiencies. If the efficiency decreases, the monitoring system may send a signal indicating that a decrease in efficiency of the process has occurred. Further, the monitoring system may identify one or more parts causing the decrease in efficiency and display to a user the one or more parts that have degraded. By identifying the degraded parts, the combined cycle power plant may operate at increased efficiencies.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A monitoring system of a combined cycle power plant having a topping cycle performed by a gas turbine and a bottoming cycle performed by a steam turbine, the monitoring system comprising:
a processor operatively coupled to a memory, wherein the processor is configured to:
receive a first set of data indicating a first measurement value of an operating parameter of the bottoming cycle, wherein the operating parameter is associated with a process performed by the bottoming cycle of the combined cycle power plant;
determine a baseline efficiency of the process based on the first measurement value using a bottoming cycle performance (BCP) model, wherein the BCP model is configured to determine the baseline efficiency based on a relationship between the first measurement value and an output of the combined cycle power plant, and wherein the baseline efficiency is associated with nominal operation of the combined cycle power plant;
determine a threshold based on the baseline efficiency, wherein the threshold is associated with a range of deviation from the baseline efficiency;
receive a second set of data indicating a second measurement value of the operating parameter after receiving the first set of data;
compare the threshold to an operational efficiency, wherein the operational efficiency is determined based on the second measurement value using the BCP model; and
provide an indication of a decrease in efficiency of the process if the operational efficiency is outside the threshold.

2. The monitoring system of claim 1, wherein the processor is configured to identify one or more parts causing the decrease in efficiency of the process.

3. The monitoring system of claim 1, wherein the processor is configured to receive the second set of data at periodic intervals.

4. The monitoring system of claim 1, wherein the monitoring system is located remotely from the combined cycle power plant.

5. The monitoring system of claim 1, wherein the second set of data comprises real-time data received via sensors on the combined cycle power plant.

6. The monitoring system of claim 1, wherein the threshold is associated with degradation of performance of one or more parts of the combined cycle power plant.

7. A non-transitory computer readable medium comprising instructions configured to be executed by a processor of a monitoring system of a combined cycle power plant having a topping cycle performed by a gas turbine and a bottoming cycle performed by a steam turbine, wherein the instructions comprise instructions configured to cause the processor to:
receive a first set of data indicating a first measurement value of an operating parameter of the bottoming cycle, wherein the operating parameter is associated with a process performed by the bottoming cycle of the combined cycle power plant;
determine a baseline efficiency of the process based on the first measurement value using a bottoming cycle performance (BCP) model, wherein the BCP model is configured to determine the baseline efficiency based on a relationship between the first measurement value and an output of the combined cycle power plant, and wherein the baseline efficiency is associated with nominal operation of the combined cycle power plant;
determine a threshold based on the baseline efficiency, wherein the threshold is associated with a range of deviation from the baseline efficiency;
receive a second set of data indicating a second measurement value of the operating parameter after receiving the first set of data;
compare the threshold to an operational efficiency, wherein the operational efficiency is determined based on the second measurement value using the BCP model; and
provide an indication of a decrease in efficiency of the process if the operational efficiency is outside the threshold.

8. The non-transitory computer readable medium of claim 7, comprising instructions configured to cause the processor to provide, on a display of the monitoring system, a visualization of the operational efficiency over time.

9. The non-transitory computer readable medium of claim 7, wherein the baseline efficiency comprises a heat recovery steam generator (HRSG) high pressure intermediate pressure (HPIP) efficiency, HRSG low pressure (LP) efficiency, steam turbine efficiency, or any combination thereof.

10. The non-transitory computer readable medium of claim 7, wherein the first measurement value comprises a flow measurement value, a temperature measurement value, or a pressure measurement value, or any combination thereof.

11. The non-transitory computer readable medium of claim 7, comprising instructions configured to cause the processor to identify one or more parts causing the decrease in efficiency of the process, wherein the one or more parts comprise a heat recovery steam generator (HRSG), a condenser, a turbine of the steam turbine, or any combination thereof.

12. A method, comprising:
receiving a first set of data indicating a first measurement value of an operating parameter of a bottoming cycle, wherein the operating parameter is associated with a process performed by a bottoming cycle of a combined cycle power plant;
determining a baseline efficiency of the process based on the first measurement value using a bottoming cycle performance (BCP) model, wherein the BCP model is configured to determine the baseline efficiency based on a relationship between the first measurement value and an output of the combined cycle power plant, and wherein the baseline efficiency is associated with nominal operation of the combined cycle power plant;
determining a threshold based on the baseline efficiency, wherein the threshold is associated with a range of deviation from the baseline efficiency;
receiving a second set of data indicating a second measurement value of the operating parameter after receiving the first set of data;
comparing the threshold to an operational efficiency, wherein the operational efficiency is determined based on the second measurement value using the BCP model; and
providing an indication of a decrease in efficiency of the process if the operational efficiency is outside the threshold.

13. The method of claim 12, comprising identifying one or more parts of the combined cycle power plant causing the decrease in efficiency of the process.

14. The method of claim 12, comprising receiving the second set of data at periodic intervals.

15. The method of claim 12, wherein the baseline efficiency comprises a heat recovery steam generator (HRSG) high pressure intermediate pressure (HPIP) efficiency, HRSG low pressure (LP) efficiency, steam turbine efficiency, or any combination thereof.

16. The method of claim 12, wherein the first measurement value comprises a flow measurement value, a temperature measurement value, or a pressure measurement value, or any combination thereof.

17. The method of claim 12, wherein the BCP model comprises an equation that relates total energy losses (TEL) of energy delivered to a shaft of the combined cycle power plant to the first measurement value and the second measurement value.

18. The method of claim 12, comprising providing, on a display of a monitoring system of the combined cycle power plant, a visualization of the operational efficiency over time.

19. The method of claim 12, comprising associating the threshold with degradation of performance of one or more parts of the combined cycle power plant.

20. The method of claim 12, comprising inputting the first measurement value into the BCP model to determine a total energy loss of a steam turbine of the combined cycle power plant.

* * * * *